(12) United States Patent
Freerksen et al.

(10) Patent No.: US 6,260,117 B1
(45) Date of Patent: *Jul. 10, 2001

(54) METHOD FOR INCREASING EFFICIENCY IN A MULTI-PROCESSOR SYSTEM AND MULTI-PROCESSOR SYSTEM WITH INCREASED EFFICIENCY

(75) Inventors: Donald Lee Freerksen, Rochester; Gary Michael Lippert, Kasson, both of MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,961

(22) Filed: Jan. 8, 1998

Related U.S. Application Data

(63) Continuation-in-part of application No. 08/932,826, filed on Sep. 18, 1997, now Pat. No. 6,065,098.

(51) Int. Cl.⁷ ........................................ G06F 12/08
(52) U.S. Cl. .................... 711/146; 711/141; 711/144; 711/145; 711/169; 711/118
(58) Field of Search .................... 711/141, 144, 711/146, 147, 151, 152, 155, 168, 169, 145, 118

(56) References Cited

U.S. PATENT DOCUMENTS

| | | | |
|---|---|---|---|
| 5,297,269 | 3/1994 | Donaldson et al. | 710/116 |
| 5,404,482 | 4/1995 | Stamm et al. | 711/145 |
| 5,404,483 | 4/1995 | Stamm et al. | 711/144 |

(List continued on next page.)

OTHER PUBLICATIONS

Israel, Paul et al, 1995 Electronic Engineering Times (Jun. 19), pp. 78–80, "Chip Set Aims to Speed Secondary Cache—Parallelism Enhances Level 2 Cache Runs".

Jouppi, Norman P., 17th Annual International Symposium on Computer Architectrue (May 28–31, 1990), pp. 364–373, "Improving Direct-Mapped Cache Performance by the Addition of a Small Fully-Associative Cache and Prefetch Buffers".

(List continued on next page.)

*Primary Examiner*—Matthew Kim
*Assistant Examiner*—Pierre Michel Bataille
(74) *Attorney, Agent, or Firm*—Birch, Stewart, Kolasch & Birch

(57) ABSTRACT

The multi-processor system according to the present invention includes at least two processors, a system bus providing communication between the processors, and a bus arbiter generating system responses to commands on the system bus. One of the processors generates a snoop response to a snooped command based on the system response to a command, associated with the same real address as the snooped command, which issued from the processor. In response to a command requesting invalidation of a cache line, a cache within the processor conditionally casts back the cache line to a transition cache in the processor. Based on the system response to the invalidation command, the transition cache either discards the cast back or converts the cast back into a command for writing the cache line in the main memory of the system. The processor also converts an exclusive read command requiring a reservation to a non-exclusive read command if that reservation has been lost prior to placing the command on the system bus. Furthermore, the transition cache in the processor may shift the memory coherency image state for a non-exclusive command, which is waiting for data to return, if a command associated with the same real address is snooped. In response to a command requesting a cache line, the cache in the processor copies that cache line to the transition cache and updates the state for the cache line. The transition cache holds the cache line until a system response is received.

10 Claims, 12 Drawing Sheets

| This Processor's Command | Snooped Command from System Bus | This processor's TCache State | Has Data Started to Arrive for this Access? | This Processor's Tcache Response | This Processor's new TCache State |
|---|---|---|---|---|---|
| Non-Exclusive | Exclusive | E,S,O | No | Null | I |
| Non-Exclusive | Exclusive | E,S,O | Yes | Retry | Unchanged |
| Non-Exclusive | Non-Exclusive | E,S,O | No | Shared | S |
| Non-Exclusive | Non-Exclusive | E,S,O | Yes | Retry | Unchanged |
| Exclusive | Not Applicable | M | Not Applicable | Retry | Unchanged |
| Exclusive | Not Applicable | E | Not Applicable | Retry | Unchanged |

U.S. PATENT DOCUMENTS

| | | | |
|---|---|---|---|
| 5,506,971 | | 4/1996 | Gullette et al. .................... 711/145 |
| 5,623,628 | * | 4/1997 | Brayton et al. .................... 711/141 |
| 5,659,710 | * | 8/1997 | Sherman et al. ................... 711/146 |
| 5,666,515 | * | 9/1997 | White et al. ....................... 711/152 |
| 5,704,058 | * | 12/1997 | Derrick et al. ..................... 711/168 |
| 5,732,244 | * | 3/1998 | Gujral ................................ 711/141 |
| 5,737,758 | * | 4/1998 | Merchant ........................... 711/146 |
| 5,751,995 | * | 5/1998 | Sarangdhar ........................ 711/145 |
| 5,790,892 | * | 8/1998 | Kaiser et al. ........................ 710/48 |
| 5,796,977 | * | 8/1998 | Sarangdhar et al. .................. 709/1 |
| 5,832,276 | * | 11/1998 | Feiste et al. ...................... 710/240 |
| 5,875,467 | * | 2/1999 | Merchant ........................... 711/140 |
| 5,926,830 | * | 7/1999 | Fieste ................................ 711/146 |
| 5,960,457 | * | 9/1999 | Skrovan et al. .................... 711/146 |
| 5,974,511 | * | 10/1999 | Boddu et al. ...................... 711/146 |
| 6,029,204 | * | 2/2000 | Arimilli et al. .................... 711/146 |
| 6,065,098 | * | 5/2000 | Lippert .............................. 711/122 |

OTHER PUBLICATIONS

Stiliadis, Dimitrios et al, IEEE Proceedings of the 27th Annual Hawaii International Conference on System Sciences (1994), pp. 412–421, "Selective Victim Caching: A Method to Improve the Performance of Direct–Mapped Caches".

Stiliadis, Dimitrios et al, IEEE Transactions on Computers, vol. 46, No. 5 (May 1997), pp. 603–610, "Selective Victim Caching: A Method to Improve the Performance of Direct-Mapped Caches".

* cited by examiner

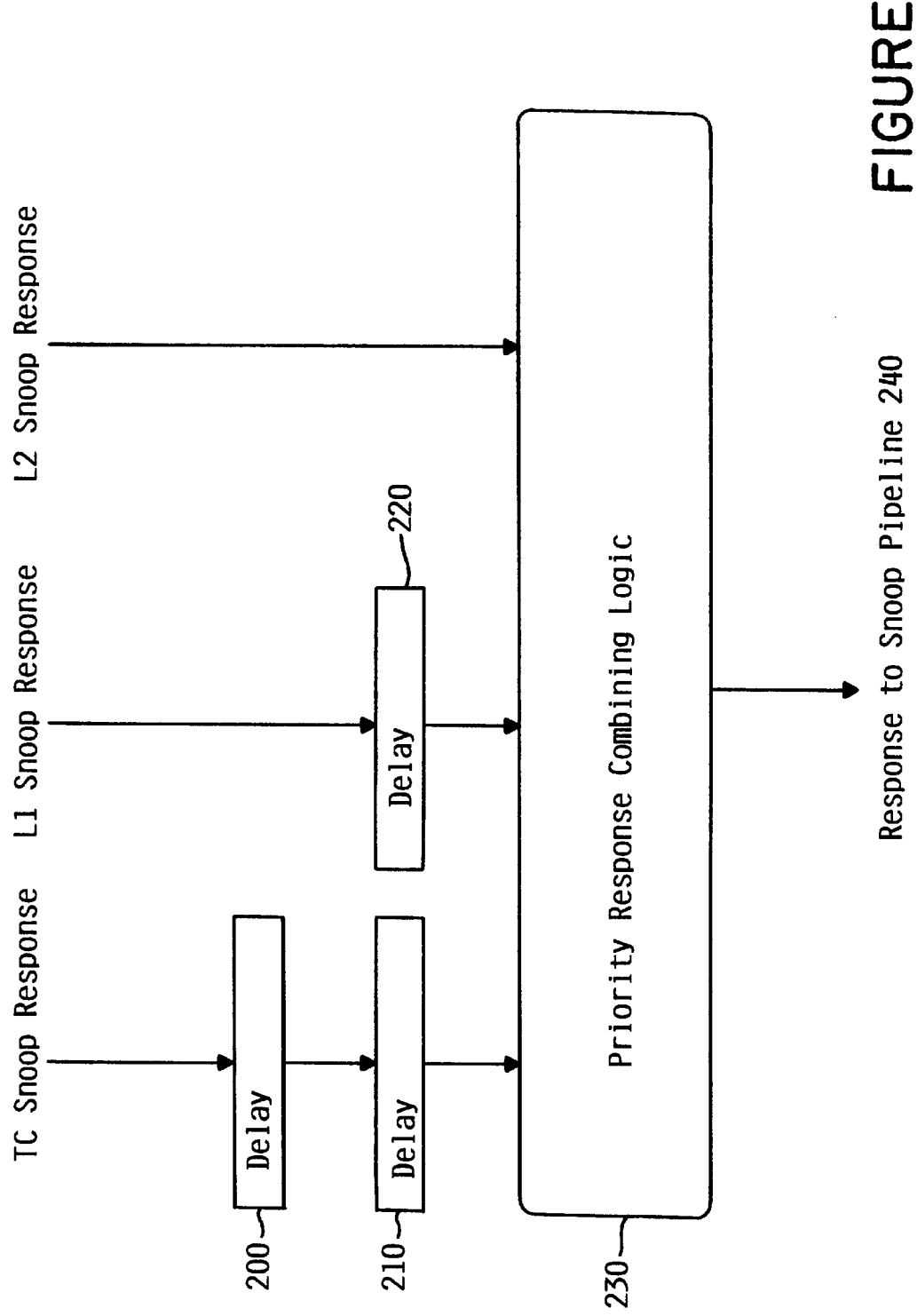

| TC Response | L1 Response | L2 Response | Combined Response |
|---|---|---|---|
| Retry | Any | Any | Retry |
| Any | Retry | Any | Retry |
| Any | Any | Retry | Retry |
| Modified | Not Retry | Not Retry | Modified |
| Not Retry | Modified | Not Retry | Modified |
| Not Retry | Not Retry | Modified | Modified |
| Shared | Shared/Null | Shared/Null | Shared |
| Shared/Null | Shared | Shared/Null | Shared |
| Shared/Null | Shared/Null | Shared | Shared |
| Null | Null | Null | Null |

FIGURE 4

| L(n) Response | L(n+1) MESI | L(n+1) Response |
|---|---|---|
| Retry | No Change | Any |
| Modified | No Change | Retry |
| Modified | MESI->I | Not Retry |
| Shared | No Change | Retry |
| Shared | M | |
| Shared | ES->SI | Shared |
| Shared | I | Null |
| Null | No Change | Retry |
| Null | M->MSI | Modified |
| Null | ES->SI | Shared |
| Null | I | Null |

FIGURE 8

| Snooped Second Command from System Bus | L1/L2 Cache State | TC Response | System Response to First Command | Combined Response |
|---|---|---|---|---|
| Exclusive | Unknown | Retry | Not Applicable | Retry |
| Exclusive | Known and Invalid | Retry | Not Applicable | Retry |
| Non-Exclusive | Unknown | Retry | Not Applicable | Retry |
| Non-Exclusive | Known and Invalid | Conditional Retry | Retry | Not Retry |
| Non-Exclusive | Known and Invalid | Conditional Retry | Not Retry | Retry |

FIGURE 9

| L1 State | L2 State | System Coherency Response Received | System Bus Command Out |
|---|---|---|---|
| Modified->Invalid | MESI->I | Not Retry | None |
| Modified->Invalid | MESI->I | Retry | Write to memory |
| ESI->I | Modified->Invalid | Not Retry | None |
| ESI->I | Modified->Invalid | Retry | Write to memory |

FIGURE 10

| This Processor's Command | Snooped Command from System Bus | This processor's TCache State | Has Data Started to Arrive for this Access? | This Processor's Tcache Response | This Processor's new TCache State |
|---|---|---|---|---|---|
| Non-Exclusive | Exclusive | E,S,O | No | Null | I |
| Non-Exclusive | Exclusive | E,S,O | Yes | Retry | Unchanged |
| Non-Exclusive | Non-Exclusive | E,S,O | No | Shared | S |
| Non-Exclusive | Non-Exclusive | E,S,O | Yes | Retry | Unchanged |
| Exclusive | Not Applicable | M | Not Applicable | Retry | Unchanged |
| Exclusive | Not Applicable | E | Not Applicable | Retry | Unchanged |

FIGURE 11

| L1 State | L2 State | System Coherency Response Received | System Bus Command Out |
|---|---|---|---|
| Modified->S,I | MESI->I | Not Retry | None, Source data |
| Modified->S,I | MESI->I | Retry | Write to memory |
| ESI->I | Modified->S,I | Not Retry | None, Source data |
| ESI->I | Modified->S,I | Retry | Write to memory |
| ESI->S,I | EOS->S,I | Not Retry | None, Source data |
| ESI->S,I | EOS->S,I | Retry | None, Discard data |

FIGURE 12

METHOD FOR INCREASING EFFICIENCY IN A MULTI-PROCESSOR SYSTEM AND MULTI-PROCESSOR SYSTEM WITH INCREASED EFFICIENCY

This is a continuation-in-part of application Ser. No. 08/932,826 filed on Sep. 18, 1997 (now U.S. Pat. No. 6,065,098 issued Mar. 16, 2000), the entire contents of which are hereby incorporated by reference.

BACKGROUND OF THE INVENTION

1. Field of the Invention

The present invention relates to a method for increasing efficiency in a multi-processor system and a multi-processor system with increased efficiency.

2. Description of Related Art

The processors in conventional multi-processor systems include inclusive caches, which means that the higher level caches store the same cache lines stored in the lower level caches as well as cache lines not stored in the lower level caches.

For instance, in a processor having a level one or L1 cache and an external level two or L2 cache, the L1 cache, by design, is disposed closer to the execution units of the processor and has a lower storage capacity than the L2 cache such that the L1 cache has a lower access time. The L2 cache, however, stores a larger number of cache lines and includes all the cache lines stored in the L1 cache. Because of this inclusivity, only the L2 cache needs to monitor commands on the system bus, which provides communication between the processors, and generate responses thereto. This monitoring of commands on the system bus is referred to as snooping.

Commands on the system bus are snooped as part of a memory coherency protocol. Typically, such protocols require the caches in each processor to associate a memory coherency image state with each cache line. The memory coherency image state of a cache line indicates the status of the cache line. Through snooping, the caches of a processor continually update the memory coherency image state for each cache line stored therein.

A cache snoops a command by determining whether the real address associated with the snooped command matches the real address of a cache line stored therein. If a match is found, the cache updates the memory coherency image state for the cache line in a well-known manner, and outputs a snoop response based on the updated memory coherency image state in a well-known manner. If no match is found, the cache outputs a snoop response indicating no match found.

Using inclusive caches, however, requires higher level caches (1) to track the cache lines stored in the lower level caches, and (2) to constantly update the cache lines stored therein based on changes in the cache lines stored by the lower level caches. By using non-inclusive caches, both the tracking and updating functions can be eliminated. Because the caches are non-inclusive, each cache must be considered when snooping a command. Outputting multiple responses to one snooped command from a single processor, however, increases the complexity of maintaining data integrity.

Whether inclusive or non-inclusive caches are used, conventional multi-processor systems suffer from various inefficiencies when processing commands and updating memory coherency image states. For the purpose of discussing these inefficiencies, the MESI memory coherency image state protocol will be used.

As is well-known, the MESI states are Modified, Exclusive, Shared, Invalid, shared Owner, fill Pending, and various error states. Modified means that cache line associated therewith includes modified data. Exclusive means the cache storing the cache line has exclusive ownership of the cache line. Shared means that the associated cache line is also stored in another cache. Shared Owner means that the associated cache line is stored in another cache, but that the cache storing the cache line has had the last access to the cache line. Fill Pending means that a command associated with the cache line has not received a system response thereto.

In response to instructions from the associated processor, caches often generate commands. These commands are placed on a system bus providing communication between the processors of the multi-processor system. The processors connected to the system bus snoop these commands, or more properly the cache or caches associated with the processors snoop these commands, and generate snoop responses thereto. The snoop responses are generated based on the MESI states of cache lines having the same real address as the real address associated with the snooped command or the lack of such cache lines. The possible snoop responses include, in order of priority: retry, indicating that the snooped command should be retried at a later point in time; the MESI state Modified; the MESI state Shared; and null, indicating no real address match.

The caches also update the MESI state of the cache lines stored therein based on the type of command snooped. Generally, commands are either exclusive or non-exclusive. Exclusive means that the processor issuing the command intends to store, flush or invalidate the cache line in some way, while non-exclusive means that this cache line could be shared.

An arbiter connected to the system bus collects the snoop response from each processor and generates a system response. Typically the system response is the highest priority snoop response among those output by the processors. The system response notifies the processors whether the command can not be completed at this time because of, for example, a collision with another command, i.e., the retry response, or whether the command can complete and the effect on other processors, i.e., any response other than retry referred to as not retry.

A collision occurs, for instance, when a first processor issues a first command associated with a cache line and before that first command completes, a second processor issues a second command associated with the same cache line. In this event, the first processor will maintain memory coherency by always outputting a retry snoop response to the second command. Accordingly, having to process the retry response and reissue the second command at a later time reduces the efficiency of the multi-processor system.

An unwanted number of retries and resulting decrease in efficiency also occurs when a processor issues a kill command. A kill command is one that requests each cache storing the associated cache line to invalidate that cache line regardless of the MESI state therefor. But, when the MESI state for the cache line in the cache of a processor is modified, that processor, to preserve the modified data, will output the cache line for storage in the main memory of the multi-processor system. This is referred to as performing a castback of the cache line. As a result of needing to castback the cache line, the processor will output a retry response to the kill command. Again, the reason for responding to the kill command in this fashion is memory coherency. The castback causes the modified data to be stored in a main memory of the system; thus, preserving the modifications.

SUMMARY OF THE INVENTION

One object of the present invention is to provide a method for maintaining multi-level cache coherency in a processor with non-inclusive caches.

Another object of the present invention is to provide a processor with non-inclusive caches which maintains coherency therebetween.

A further object of the present invention is to provide a method and higher level cache which prevent collisions between two cache queries, one of which is the result of a snooped command.

Also an object of the present invention is to provide a method of increasing efficiency in a multi-processor system and a multi-processor system having increased efficiency.

Another object of the present invention is to provide a method of increasing efficiency in a multi-processor system and a multi-processor system having increased efficiency which reduce the number of retry responses.

A further object of the present invention is to provide a method of increasing efficiency in a multi-processor system and a multi-processor system having increased efficiency which update memory coherency image states more efficiently.

A still further object of the present invention is to provide a method of increasing efficiency in a multi-processor system and a multi-processor system having increased efficiency which prevent unwanted and undesirable invalidation of a cache line throughout the multi-processor system.

These and other objectives are achieved by providing a processor which includes at least a lower and a higher level non-inclusive cache, and a system bus controller. The system bus controller snoops commands on the system bus, and supplies the snooped commands to each level of cache. Additionally, the system bus controller receives the snoop responses to the snooped command from each level of cache, and generates a combined response thereto.

When generating responses to the snooped command, each lower level cache supplies its response to the next higher level cache. Higher level caches generate their response to the snooped command based in part upon the response of the lower level caches. Also, high level caches determine whether or not the cache address, to which the real address of the snooped command maps, matches the cache address of at least one previous high level cache query. If a match is found by a high level cache, then the high level cache generates a retry response to the snooped command, which indicates that the snooped command should be resent at a later point in time, in order to prevent a collision between cache queries.

The objectives are further achieved by providing a multi-processor system including at least first and second processors, a system bus providing communication between the first and second processors, and a bus arbiter generating system responses to commands on the system bus. The first processor generates a first command associated with a real address, and the second processor generates a second command associated with a real address. When the first processor snoops the second command on the system bus, the first processor delays generating a snoop response to the second command until the system response to the first command is received. Based on the system response to the first command, the first processor generates a snoop response to the second command.

The objectives are additionally achieved by providing a multi-processor system including at least first and second processors, a system bus providing communication between the first and second processors and a bus arbiter generating system responses to commands on the system bus. The first processor has at least one level of cache associated therewith, a system bus controller controlling communication between the first processor and the system bus, and a transition cache serving as an interface between each level of cache and the system bus controller. When the first processor snoops a first command on the system bus requesting invalidation of a cache line, each level of cache associated with the first processor invalidates the cache line prior to the first processor snooping a system response to the first command. Additionally, if the memory coherency image state for the cache line in the one of the caches indicates that modified data is included therein, then prior to invalidating the cache line, the cache generates a castback command and transfers the castback command and a copy of the cache line to the transition cache. If the system response to the first command is a retry, then the transition cache converts the castback command to a second command which requests that the cache line be stored in a main memory of the multi-processor system. If a non-retry system response to the first command is received, then the castback command is discarded by the transition cache.

The objects are also achieved by providing a multi-processor system having at least first and second processors, a system bus providing communication between the first and second processors, and a bus arbiter generating system responses to commands on the system bus. The first processor includes at least a level one cache, a system bus controller controlling communication between the first processor and the system bus, and a transition cache controlling and tracking communication between each level of cache and the system bus controller. The system bus controller checks a reservation of a first command, which requires a reservation, generated by the level one cache prior to placing the first command on the system bus. If the reservation has been lost, then the system bus controller converts the first command into a second command, which does not require a reservation, and places the second command on the system bus.

The objects of the present invention are still further achieved by providing a multi-processor system including at least first and second processors, a system bus providing communication between the first and second processors, and a bus arbiter generating system responses to commands on the system bus. The first processor has at least one level of cache associated therewith, a system bus controller controlling communication between the first processor and the system bus, and a transition cache controlling and tracking communication between each level of cache and the system bus controller. The transition cache determines whether data has started to arrive at the transition cache in response to a non-exclusive command when the first processor snoops a command on the system bus associated with the same real address as the non-exclusive command. Based on whether data has started to arrive at the transition cache, the transition cache generates a snoop response to the snooped command.

Additional objects of the present invention are achieved providing a multi-processor system including at least first and second processors, a system bus providing communication between the first and second processors, and a bus arbiter generating system responses to commands on the system bus. The first processor has at least one cache associated therewith, a system bus controller controlling communication between the first processor and the system bus, and a transition cache controlling and tracking communication between each cache and the system bus controller. When the first processor receives a first command on the system bus requesting a cache line, one of the caches associated with the first processor that stores the requested cache lines copies the requested cache line to the transition cache as part of a response to the first command. Each cache associated with the first processor that stores the requested cache line then updates the memory coherency image state associated with the requested cache line prior to snooping a system response to the first command. Then, once the first processor snoops the system response on the system bus to the first command, the requested cache line is processed at the first processor based on the system response.

Other objects, features, and characteristics of the present invention; methods, operation and functions of the related elements of the structure; combination of parts; and economies of manufactural will become apparent from the following detailed description of the preferred embodiments and accompanying drawings, all of which form a part of the specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 illustrates a portion of the system bus controller according to the present invention;

FIG. 4 illustrates a table showing the generation of the combined response by the priority combining logic according to the present invention;

FIG. 8 illustrates a Table which shows a higher level cache's snoop response based in part on the response from the lower level cache;

FIG. 9 illustrates a table showing the generation of a conditional retry response by the transition cache and the possible combined responses;

FIG. 10 illustrates a table showing the possible MESI state changes at the caches of a processor in response to a kill command when the MESI state for one of the caches was initially modified and the possible resulting commands output from the processor;

FIG. 11 illustrates a table showing the transition cache snoop response and possible MESI state change when a collision occurs between a first command stored at the transition cache and a later snooped second command; and FIG. 12 illustrates a table showing the possible MESI state changes at the caches of a processor receiving a first command requesting a cache line stored therein and the resulting second command output by the processor for each possible system response to the first command.

Figure 1:
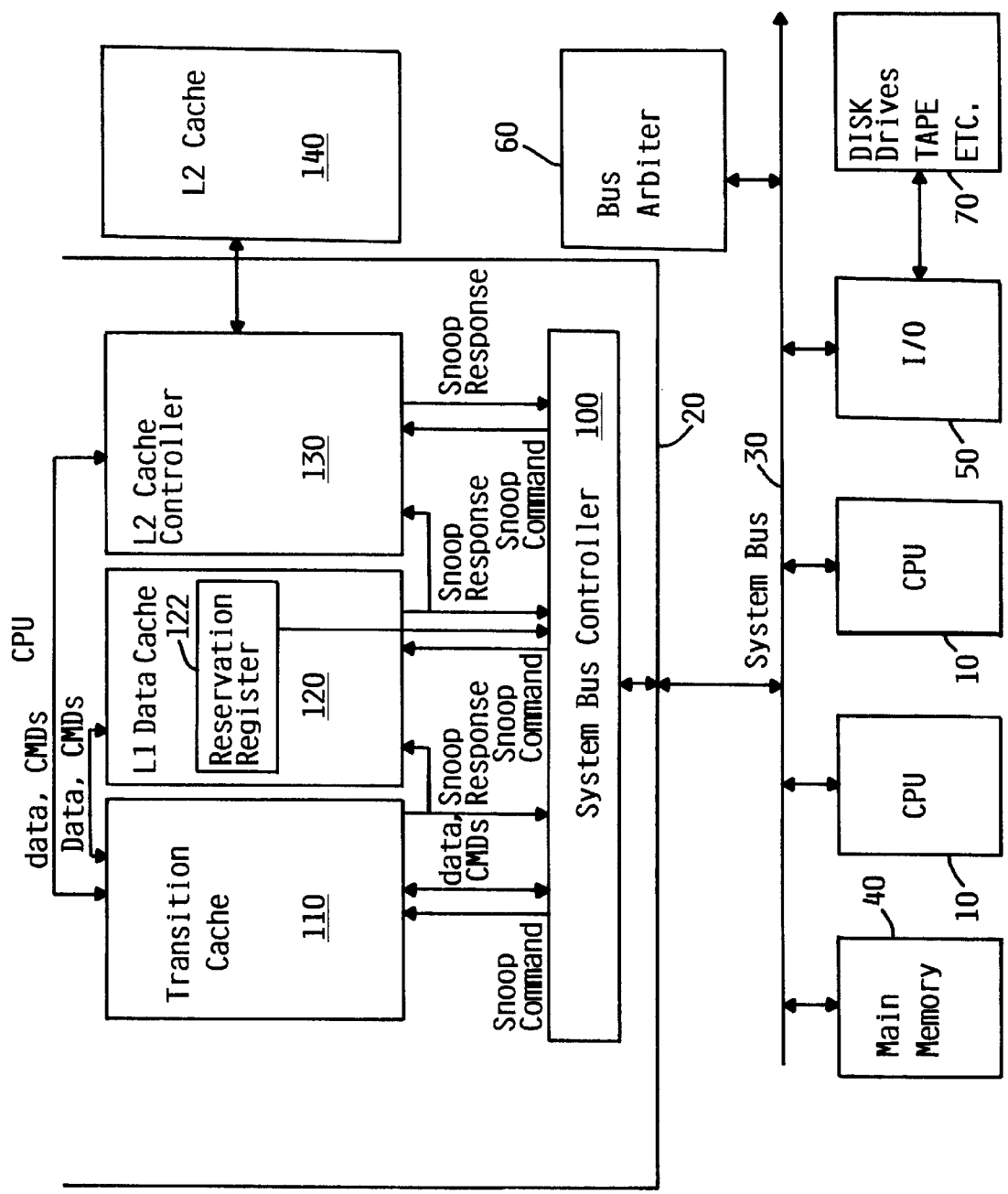
FIG. 1 illustrates a multi-processor system including a processor with non-inclusive caches which employs the method for obtaining multi-level cache coherency according to the present invention.

It is respectfully suggested that FIG. 1 be printed on the face of the patent.

DETAILED DESCRIPTION OF THE PREFERRED EMBODIMENTS

FIG. 1 illustrates a multi-processor system including a processor with non-inclusive caches which employs the method for maintaining multi-level cache coherency and the method for increasing efficiency in a multi-processor system according to the present invention. The system includes a system bus 30 interconnecting multiple processors 10 and at least one processor 20 with non-inclusive caches. The processor 20 may include inclusive or non-inclusive caches, however, when only employing the method for increasing efficiency in a multi-processor system according to the present invention. In a preferred embodiment of this method, and for the purposes of discussion, the processor 20 will be described with non-inclusive caches.

A main memory 40, one or more input/output or I/O interfaces 50, and a bus arbiter 60 are also connected to the system bus 30. Disk drive storage devices, tape storage devices, etc. 70 are connected to the I/O interfaces 50.

The multiple processors 10 and the processor 20 communicate over the system bus 30 with each other, the main memory 40, and the I/O interfaces 50. The I/O interfaces 50 control the operation of such input and output devices as disk drive storage device, tape storage devices, etc. The main memory 40 serves as central storage for the multi-processor system, and stores, for instance, all the cache lines in the system. The bus arbiter 60 decides which of the devices connected to the system bus 30 drives the system bus 30 based on any well-known protocol. Also, for each command placed on the system bus 30, the bus arbiter 60 collects the snoop responses thereto, and generates as the system response the highest priority response collected.

Besides the processor 20, one or more of the multiple processors 10 could also be a processor according to the present invention. As shown in FIG. 1, the processor 20 includes a system bus controller 100 which controls communication between the system bus 30 and the processor 20. A transition cache 110, level one or L1 data cache 120, with controller included, and a level two or L2 cache controller 130 are connected to the system bus controller 100. A level two or L2 cache 140, external to the processor 20, is connected directly to the L2 cache controller 130. The L1 data cache 120, the L2 cache controller 130 and L2 cache 140 are connected to the transition cache 110. The L1 data cache 120 includes a reservation register 122 for storing the reservation bit set by the L1 data cache 120 with respect to a command, such as a store conditional, which requires a reservation to complete. As shown in FIG. 1, the system bus controller 100 can check the status of a reservation bit stored in the reservation register 122. FIG. 1 further illustrates that the snoop response of the transition cache 110 is supplied to the L1 data cache 120, and that the snoop response of the L1 data cache 120 is supplied to the L2 cache controller 130.

It should be understood that the various paths illustrated in FIG. 1 have been represented in greatly simplified form for clarity. In reality, many separate data paths into and out of the various components are required. Furthermore, for the sake of clarity, many of the data and control lines have been eliminated entirely from the figures. It will also be appreciated that, for clarity, other components forming the processor 20, such as execution units, have been eliminated from FIG. 1.

The L1 data cache 120 has a lower storage capacity, but faster access time, than the L2 cache 140. Also, unlike what is characteristic of conventional processors, the L2 cache 140 is non-inclusive. Specifically, the L2 cache 140 does not store all of the cache lines stored in the L1 data cache 120. Consequently, the response to a snooped command provided by the L2 cache controller 130 does not represent the response to the same snooped command which could be issued by the L1 data cache 120.

As implied above, the L2 cache controller 130 controls the communication of data and commands to the L2 cache 140. As illustrated in FIG. 1, the transition cache 110 handles the communication of commands and data between the system bus controller 100, the L1 data cache 120 and, via the L2 cache controller 130, the L2 cache 140. As mentioned above, for the purpose of clarity, the connections to effect such communication between the transition cache 110 and the other components of the processor 20 have not been illustrated in detail. Also, any direct connections between the L1 data cache 120 and the L2 cache 140 have also been eliminated for clarity.

The transition cache 110 is a transition cache such as disclosed in application Ser. Nos. 08/761,378; 08/761,379; and 08/761,380, all filed Dec. 9, 1996; now respectively U.S. Pat. No. 6,000,011 (issued Dec. 7, 1999); U.S. Pat. No. 6,035,424 (issued Mar. 7, 2000); and U.S. Pat. No. 6,000,12 (issued Dec. 7, 2000); the entire contents of all are hereby incorporated by reference. Alternatively, however, the transition cache 110 could be replaced by cache line buffers which maintain the memory coherency image state of each cache line stored therein.

For purposes of discussion, the present invention will be discussed using the well-known MESI state protocol as the memory coherency image state protocol employed by the multi-processor system. It should be understood, however, that any memory coherency image protocol could be used with the present invention.

Generating a Combined Response at Processor 20

Next, the operation of the processor 20 with respect to generating a single combined response to a snooped command will be discussed. As described in detail below, the processor 20 with non-inclusive caches according to the present invention includes a system bus controller 100 which snoops commands on a system bus 30, and delays supplying those snooped commands to lower levels of cache. The delay times are set such that each lower level cache will output a snoop response at a known point in time. Based on the snoop response from each level of cache, the system bus controller 100 generates a single combined response, and outputs the combined response on the system bus 30. Besides generating snoop responses based on the snooped commands, higher level caches also generate their snoop responses based on the snoop responses of lower level caches. In this manner, the memory coherency image states in the higher level caches are efficiently updated.

During operation, the system bus controller 100 snoops commands on the system bus 30. The system bus controller 100 then supplies the snooped command to the transition cache 110, the L1 data cache 120 and the L2 cache controller 130. The system bus controller 100, however, does not simultaneously supply the snooped command to the transition cache 110, the L1 data cache 120, and the L2 cache controller 130.

Figure 2:
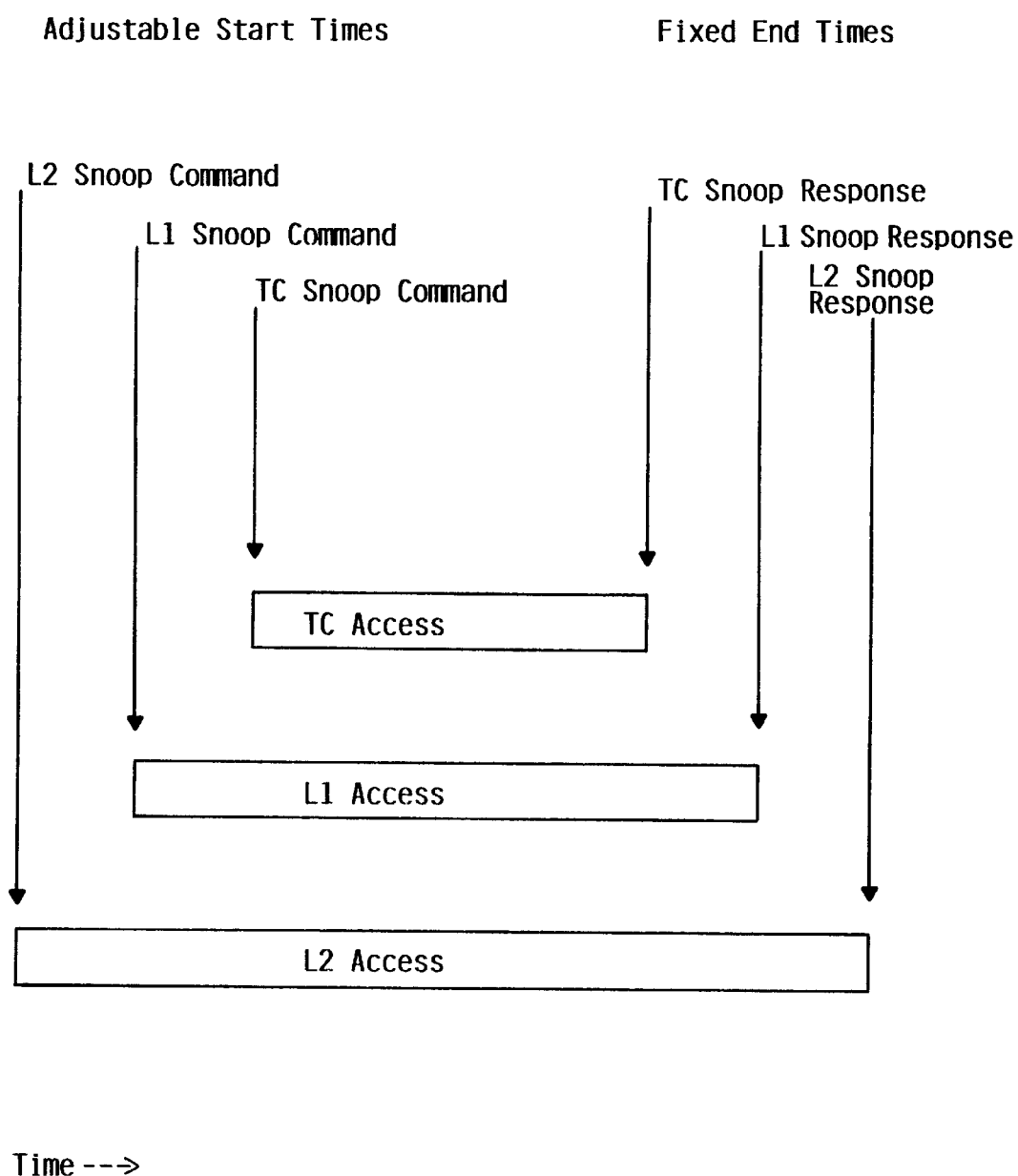
FIG. 2 illustrates the adjustments to the times at which the snoop commands are supplied to each level of cache by the processor according to the present invention.

As discussed above, the L1 data cache 120 has a faster access time then the L2 cache 140. Similarly, the transition cache 110, which has a smaller storage capacity than even the L1 data cache 120, has a faster access time than the L1 data cache 120. As shown in FIG. 2, the system bus controller 100 adjusts the time at which the snooped command is supplied to the transition cache 110, the L1 cache 120 and the L2 cache controller 130 such that the responses to the snooped command generated by the transition cache 110, the L1 data cache 120 and the L2 cache controller 130 are output at a known or a fixed time. More specifically, as shown in FIG. 2, the snooped command is supplied to the L2 cache controller 130 first, then after a predetermined period of time, the snooped command is supplied to the L1 data cache 120. After a further predetermined period of time, the snooped command is supplied to the transition cache 110.

Even in view of the delay, the transition cache 110 will generate its response prior to the L1 data cache 120 and the L2 cache controller 130 generating responses. Similarly, the L1 data cache 120 will generate a response to the snooped command prior to the L2 cache controller 130 generating a response. As stated above, the delays in supplying the snooped command to the transition cache 110 and the L1 data cache 120 are set such that the transition cache 110 and the L1 data cache 120 output their respective responses at known or fixed points in time.

When a cache such as the transition cache 110, the L1 data cache 120, and the L2 cache controller 130 receive a snooped command, the cache determines whether or not the real address associated with the snooped command matches the real address of any cache lines stored therein. If a match is found, the MESI state for that cache line is modified in a well-known manner based on the snooped command, and regardless of whether a match is found, a snoop response is generated. In the L1 data cache 120, the MESI state and snoop response are further modified based on the snoop response of the transition cache 110. Similarly, the MESI state and snoop response of the L2 cache controller 130 are further modified based on the snoop response of the L1 data cache 120.

FIG. 8 illustrates the snoop responses generated by a higher level L(n+1) cache given the MESI state of the higher level L(n+1) cache and the snoop response from the lower level L(n) cache. In the figures, "M" stands for Modified, "E" stands for Exclusive, "S" stands for shared, "O" stands for shared owner and "I" stands for invalid. Also, "→" indicates a change in the MESI state based on the snooped command.

The system bus controller 100 receives the snoop responses from the transition cache 110, the L1 data cache 120, and the L2 cache controller 130. The portion of the system bus controller 100 handling the snoop responses from the transition cache 110, the L1 data cache 120, and the L2 cache 130 is illustrated in greater detail in FIG. 3. As shown in FIG. 3, the snoop responses from the transition cache 110, the L1 data cache 120 and the L2 cache controller 130 are received by priority response combining logic 230. The response from the transition cache 110, however, is delayed by a first delay 200 and a second delay 210 prior to receipt by the priority response combining logic 230. Also, the snoop response from the L1 data cache 120 is delayed by a third delay 220 prior to receipt by the priority response combining logic 230. The first, second and third delays 200, 210 and 220 delay a signal by the same period of time in a preferred embodiment of the present invention. Also, the delay time of the first, second and third delays 200, 210 and 220 is set such that the priority response combining logic 230 receives the response from the transition cache 110, the L1 data cache 120 and the L2 cache controller 130 substantially at the same time. While not forming a part of this method, as described in detail below, the priority response combining logic 230 also selectively receives the system response for a snooped command. The priority response combining logic 230 then generates a single combined response based on the responses from the transition cache 110, the L1 data cache 120 and the L2 cache controller 130 in accordance with the Table shown in FIG. 4.

Figure 5:
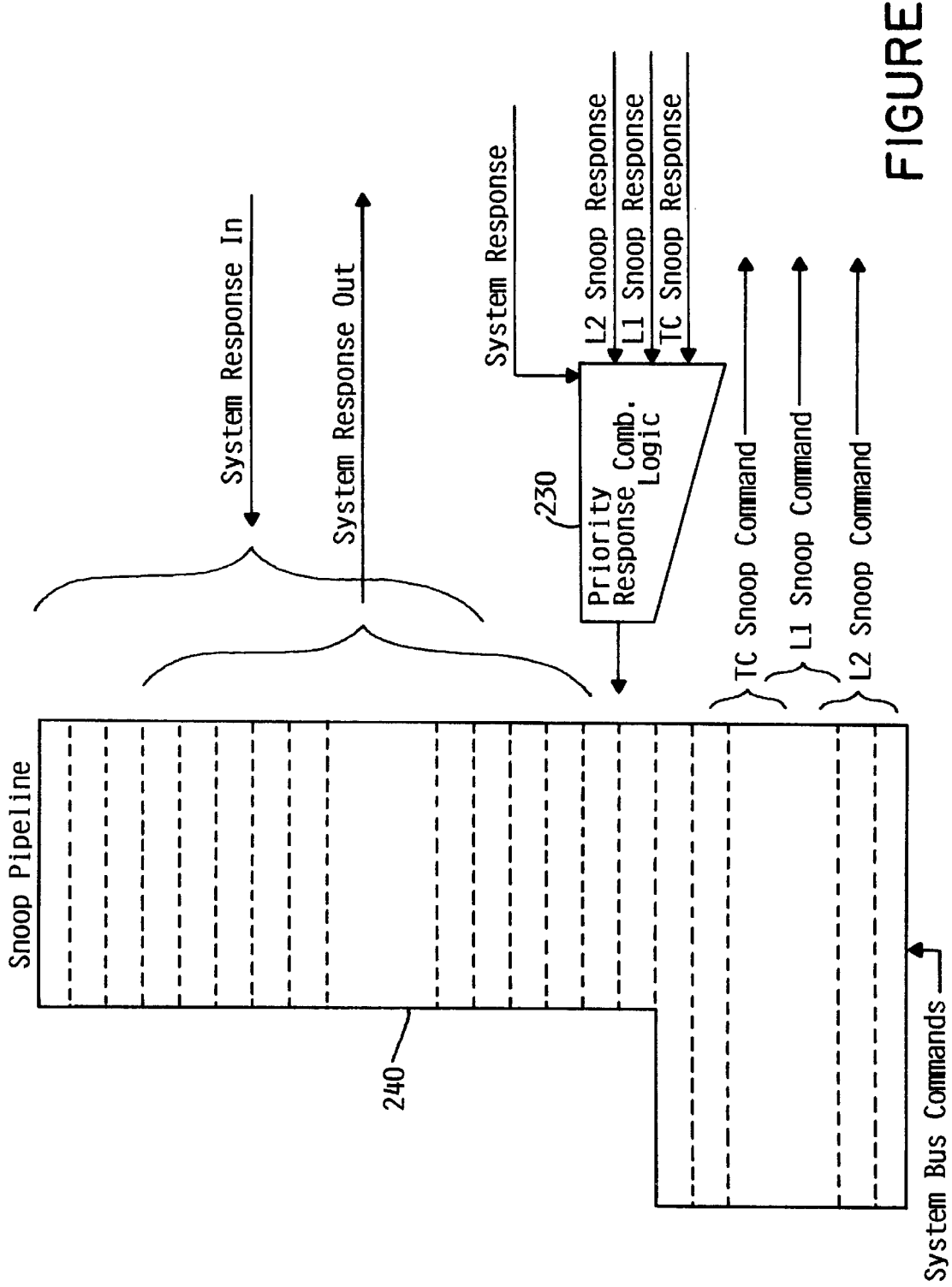
FIG. 5 illustrates the snoop pipeline in the system bus controller according to the present invention.
Figure 6:
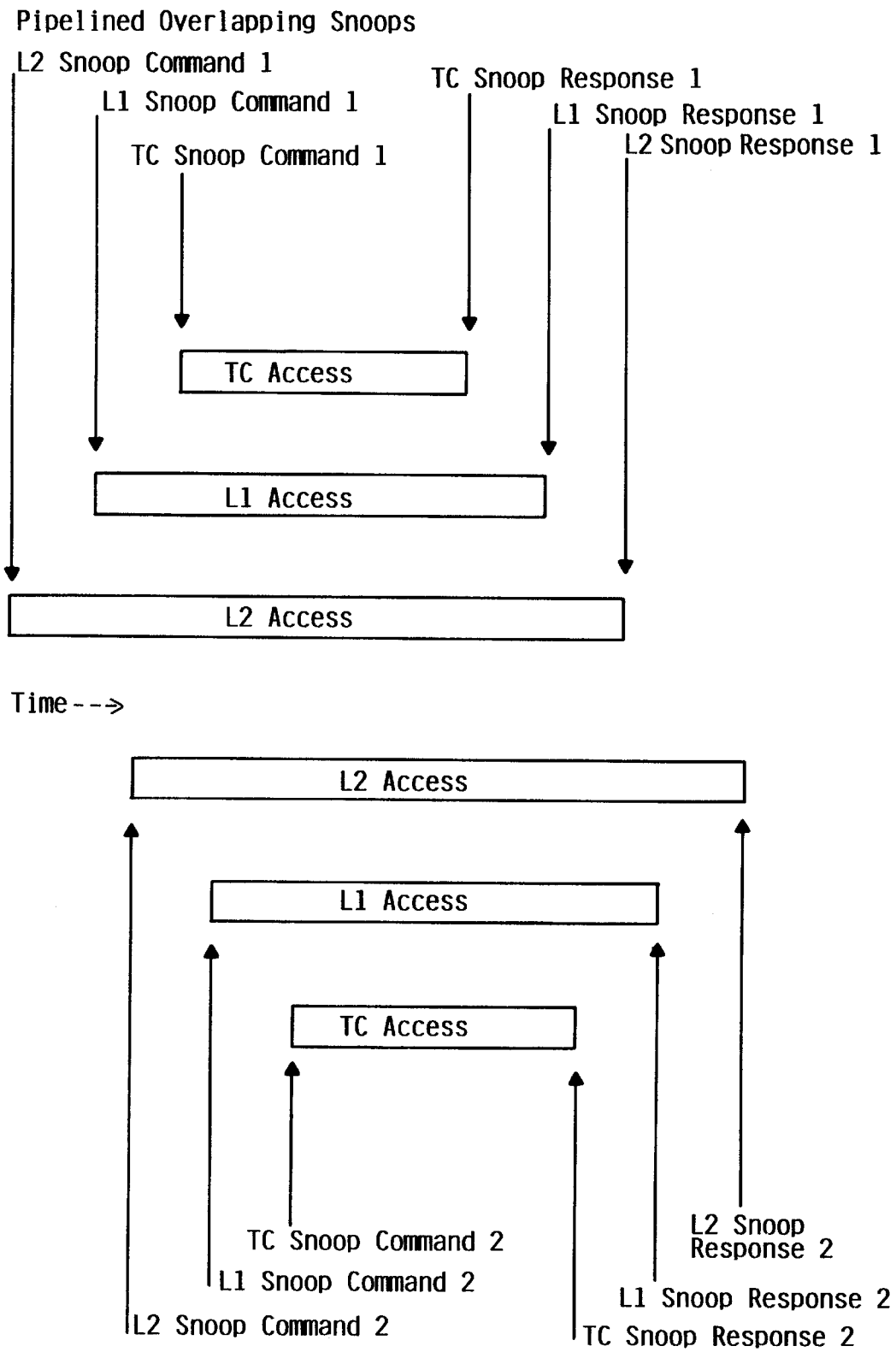
FIG. 6 illustrates the timing of overlapping snooped commands.

As shown in FIG. 3, the priority response combining logic 230 outputs the combined response to a snoop pipeline 240. The snoop pipeline 240 is illustrated in FIG. 5. As shown in FIG. 5, when the system bus controller 100 snoops a command, the command is stored in the snoop pipeline 240, i.e., memory in the system bus controller 100. As time goes on, the snooped command flows through the snoop pipeline 240. The operations taking place with respect to the snooped command are illustrated to the right of the snoop pipeline 240 in chronological order. As shown, the snooped command is sent to the L2 cache controller 130, then sent to the L1 data cache 120, and finally, sent to the transition cache 110. At some point in time prior to the receipt of the combined response from the priority response combining logic 230, portions of the snooped command are no longer needed, and thus, as shown in FIG. 5, the amount of information stored with respect to a snooped command decreases. Soon afterwards, the combined response output by the priority response combining logic 230 is stored with the snooped command. If a system response to the snooped command is not required to generate a combined response, the combined response to the snooped command is then output on the system bus 30 by the system bus controller 100, and later a system response is received and associated with the snooped command. Otherwise, generation of a combined response is delayed until the system response is received. Eventually, because the snoop pipeline 240 has a finite length, the snooped command is removed therefrom. As shown in FIG. 6, pipelining of snooped commands allows overlap thereof.

Preventing Collision Between L2 Cache Queries

Because of the longer access time of the L2 cache 140, the possibility of a collision between two L2 queries, the second of which is the result of a snooped command, exists.

A collision occurs when the two L2 queries map to the same cache address, i.e., have the same congruence class. Because of this collision, an improper response to the snooped command can be generated. For instance, suppose that the L2 cache controller 130 receives a fill request indicating a miss in the L1 data cache 120, and in response the L2 cache 140 performs an aging castback, discussed below.

Because caches have limited storage space, more than one real address can map to the same cache address. When this occurs between a cache line currently stored and a cache line to be received, the currently stored cache line is sent to, for instance, the main memory 40. Treating the currently stored cache line in this manner is called an aging castback.

When the L2 cache controller 130 performs an aging castback with respect to a cache line stored in the L2 cache 140, the cache line being castback is first transferred to the transition cache 110. The transition cache 110 then transfers the cache line to the main memory 40 via the system bus controller 100 and the system bus 30.

Next, suppose that the L2 cache controller 130 snoops a command having a real address which maps to the same cache address as the cache line which was the subject of the aging castback. If this collision were not prevented, the L2 cache controller 130 would generate a null response because the cache line was castback. If, however, the cache line had not been completely transferred to the transition cache 110 yet, then the transition cache 110 would also output a null response. Absent the collision, the L2 cache controller 130, or perhaps the transition cache 110, would have generated a non-null response. Therefore, the combined response issued by the system bus controller 100 may be improper.

The present invention avoids this problem by preventing such collisions. Namely, when the real address for a snooped command maps to the same cache address as another L2 query, the snooped command is not processed. Instead, the L2 cache controller 130 generates a retry response with respect to the snooped command, which instructs the system to retry issuing this command at a later point in time.

Figure 7:
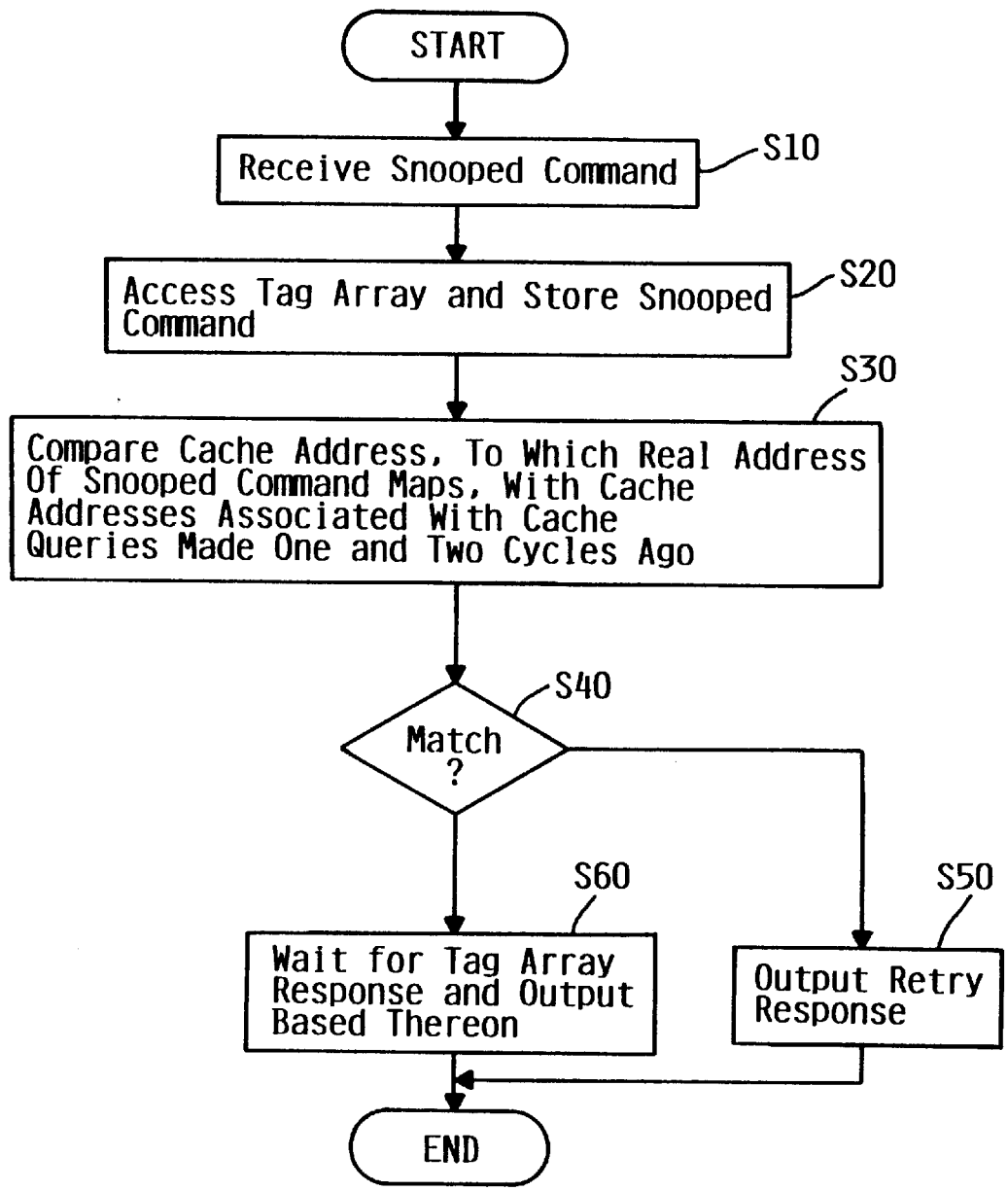
FIG. 7 illustrates a flow chart of the method for preventing collisions between two cache queries in high level caches where one of the cache queries is the result of a snooped command.

The method for preventing collisions between a snooped command and another command will be described referring to the flow chart illustrated in FIG. 7. In step S10, the L2 cache controller 130 receives a snooped command. Then, in step S20, the L2 cache controller 130 accesses the tag array or directory for the L2 cache 140, and stores the snooped command. In response to the tag array access, the L2 cache controller 130 will determine if the real address of a cache line stored in L2 cache 140 matches the real address associated with the snooped command. If a match exists, the L2 cache controller 130 accesses, from the L2 cache 140, the MESI state associated with the cache line, and, in step S60 discussed below, generates a snoop response based on the MESI state. If no match exists, the null snoop response will be generated in step S60.

In step S30, the L2 cache controller 130 compares the cache address, to which the real address of the snooped command maps, to the cache addresses associated with the L2 queries made one cycle ago and two cycles ago. Then in step S40, the L2 cache controller 130 determines whether a cache address match exists. If a match is found, the L2 cache controller 130 will output a retry response with respect to the snooped command in step S50. As shown in FIG. 4, because the L2 cache controller 130 outputs a retry response, the system bus controller 100 outputs a retry response as the combined response. As mentioned above, the retry response instructs the system to retry issuing the command at a later point in time. If no match is found, the L2 cache controller 130 waits for, in step S60, the response to the tag array access made in step S20, and once that response is received, the L2 cache controller 130 outputs a snoop response to the snooped command. In this manner, collisions between a snooped command and other commands can be detected and prevented.

Conditional Retry

Besides the responses discussed above with respect to FIG. 4, the transition cache 110 also may generate a conditional retry snoop response. When the transition cache 110 snoops a command from another processor 10 that is associated with the same real address, i.e., cache line, as a command output by the processor 20, the transition cache 110 may output a conditional retry snoop response. Depending on the system response to the command output by the processor 20, the system bus controller 100 treats the conditional retry snoop response as a retry snoop response or a not retry snoop response, i.e., a response other than a retry snoop response. In this manner, depending on the system response to the command output by the processor 20, the system bus controller 100 may not output a retry response as the combined response even though a collision between commands has occurred.

FIG. 9 illustrates a table, to be appended to the table of FIG. 4, that shows when a conditional retry snoop response is generated by the transition cache 110 and the possible combined responses output from the system bus controller 100. When the processor 20 puts a first command on the system bus 30, the status and a copy of the first command is maintained by the transition cache 110. The transition cache 110 snoops the first command on the system bus 30, and updates the MESI state for the first command. Namely, the transition cache 110 sets the MESI state for the first command to fill Pending.

Also, the MESI state of the cache line associated with the first command in the L1 data cache 120 and the L2 cache 140 will be known or unknown based on the type of the first command. For instance, if the first command is a cache line read, then the MESI state in the L1 data cache 120 and/or the L2 cache 140 is invalid. However, if the first command is a request for ownership of a cache line, the MESI state in the L1 cache 120 and/or L2 cache 140 is unknown.

If, while in the fill Pending state, the transition cache 110 snoops a second command associated with the same real address as the first command, then the transition cache 110 generates either a retry or conditional retry snoop response. As shown in FIG. 9, the transition cache 110 generates a retry snoop response if the second command is an exclusive command or if the L1 data cache 120 and/or L2 cache 140 MESI states for the cache line associated with the real address are unknown. The transition cache 110 generates a conditional retry snoop response if the second command is a non-exclusive command and the MESI states in the L1 data cache 120 and/or the L2 cache 140 for the cache line associated with the real address are known to be invalid.

Assuming that the transition cache 110 generates a conditional retry snoop response, the system bus controller 100 delays generating a combined response until a system response is received for the first command. If the system response to the first command is retry, then as shown in FIG. 9, the system bus controller 100 does not generate a combined response of retry. If, however, the system response to the first command is not retry, then the system bus controller 100 generates retry as the combined response.

As discussed above, conventionally the second command causing a collision always received a retry response regardless of the system response to the first command involved in the collision. The present invention, however, provides for instances where a retry response is not generated even in the event of a collision; thus, reducing the number of retries placed on the system bus and increasing efficiency of the multi-processor system.

Conditional Castback

Besides an aging castback, the L1 data cache 120 and L2 cache controller 130 according to the present invention perform conditional castbacks. A conditional castback allows the transition cache 110 to optionally perform a write to main memory 40 based on the system response to the command causing the generation of the conditional castback. In this manner, the number of writes to main memory 40 is reduced.

When snooping a kill command which requests that an identified cache line be invalidated without regard to the current MESI state, the L1 data cache 120 and L2 cache controller 130 generate a conditional castback command if the current MESI state is Modified. Namely, the modified data is copied to the transition cache 110 and marked as a conditional castback. The L1 data cache 120 and/or L2 cache controller 130 then set the MESI state for the cache line to invalid.

The transition cache 110 holds the modified data until a system response to the kill command is received. The transition cache 110 then processes the conditional castback command based on the system response to the kill command as shown by the table in FIG. 10. FIG. 10 also illustrates the MESI state change taking place at the L1 data cache 120 and the L2 cache 140.

As shown in FIG. 10, if the system response to the kill command is not retry, then the transition cache 110 discards the conditional castback command because the kill command has completed normally. If, however, the system response to the kill command is retry, the transition cache 110 converts the conditional castback to a memory write command for writing the modified data in the main memory 40.

Because the conditional castback is discarded in the event the kill command completes normally, the number of writes to main memory 40 is reduced as well as the number of retries on the system bus 30. Accordingly, system resources are not tied up.

Converting Exclusive Atomic Reads to Non-Exclusive, Non-Atomic Reads

As is well known, the load and reserve instruction and the store conditional instruction, together, permit atomic update, i.e., performed in its entirety with no visible fragmentation, of a storage location. The load and reserve instruction, when completed, obtains a reservation for a memory location, and causes the L1 data cache 120 to store a bit indicating the obtained reservation in the reservation register 122. The store conditional instruction can only complete if the reservation is valid when data returns to the L1 data cache 120.

Conventionally, in response to a store conditional instruction from the processor, the system bus controller therefor outputs an exclusive read regardless of whether the reservation is still valid. This causes any cache storing the cache line associated with the exclusive read to invalidate that cache line, i.e., MESI state set to Invalid. By contrast, prior to outputting an exclusive read, the system bus controller 100 of the processor 20 according to the present invention checks the validity of the reservation for this command. If the reservation has been lost, then the system bus controller 100 converts the exclusive read command to a non-exclusive read command.

Because the exclusive read issued from the L1 data cache 120, a copy thereof is stored in the transition cache 110, which tracks the progress of the command. Namely, the transition cache 110 snoops the non-exclusive read on the system bus 30, recognizes the non-exclusive read as being converted from the exclusive read command stored therein, and converts the exclusive read stored therein to a non-exclusive read.

When data returns in response to the non-exclusive read, the data is transferred to the L1 data cache 120 via the transition cache 110, and the store conditional completes but the MESI state therefor is not updated because the reservation was lost.

Because the exclusive read is converted to a non-exclusive read, the present invention prevents the cache line associated with the non-exclusive read from being unnecessarily and undesirably invalidated in the caches of the other processors 10. Accordingly, efficiency is increased by eliminating the need for those other processors 10 to re-validate the cache line.

Shifting Transition Cache State

With the transition cache implementation of present invention, a collision where another processor wants a copy of the cache line that is being filled on this processor can be detected. Most designs allow one processor to get the cache line when in transition MESI states. These designs retry all other processor accesses during this transitional period of time. The present invention allows for shifting the MESI state of the filling line at the transition cache 110, i.e., without interacting with the L1 data cache 120 and L2 cache controller 130. As a result, the present invention allows sharing with no performance impact during the time the transition cache 110 handles the cache line fill, and reduces the number of retries on the system bus 30.

As discussed previously, when a first command such as a non-exclusive read command is output by the system bus controller 100, the transition cache 110 snoops the non-exclusive read command on the system bus 30 and changes the MESI state for the non-exclusive read command to pending. Once a system response is received, the transition cache 110 updates the MESI state to one of Exclusive, Shared or shared Owner. The transition cache 110 then waits for the data associated with the non-exclusive read command to arrive.

If the transition cache 110 snoops a second command associated with the same real address as the non-exclusive read command, the transition cache 110 checks the status of the non-exclusive read command to determine if data has arrived at the transition cache 110 in response to the non-exclusive read command. As shown in FIG. 11, based on the determination of whether data has begun to arrive and whether the snooped second command is exclusive or non-exclusive, the transition cache 110 changes the MESI state for the first command and generates a snoop response to the second command.

Namely, if data has started to arrive, the transition cache 110 generates a retry snoop response and does not change the MESI state of the first command. If data has not started to arrive and the second command is an exclusive command, the transition cache 110 generates a null snoop response and changes the MESI state for the first command to Invalid. If the data has not started to arrive and the second command is a non-exclusive command, the transition cache 110 generates a shared snoop response and changes the MESI state for the first command to Shared.

As further shown in FIG. 11, if the first command is an exclusive command, then the transition cache 110 outputs a retry snoop response and the MESI state for the first command remains unchanged.

Accordingly, the present invention allows for shifting the MESI state of a non-exclusive command at the transition cache such that sharing with no performance impact is allowed and the number of retries on the system bus 30 is reduced.

Converting Cache-To-Cache Transfer to a Memory Write

This technique of the present invention allows the L1 data cache and L2 cache controller 130 to immediately update the MESI state of a requested cache line even if the read command requesting that cache line receives a retry system response. Also, the response to the read command is converted into a write command if the system response to that read command is a retry and the response includes modified data.

When the processor 20 receives a read command requesting a cache line and the cache line is stored in the L1 data cache 120 and/or the L2 cache 140, the one of the L1 data cache 120 and the L2 cache 140 having the highest MESI state, in the order of Modified, Exclusive shared Owner and Shared, copies the cache line to the transition cache 110. The L1 data cache 120 and/or the L2 cache 140 which store the cache line then update the MESI state therefor as shown in the table of FIG. 12.

The system bus controller 100 receives the cache line and holds the cache line until the system response to the read command is received. FIG. 12 illustrates a table showing how the system bus controller 100 processes the cache line based on the system response. As shown in FIG. 12, if the system response to the read command is not retry, the system bus controller 100 sources the cache line to the system bus 30. If, however, the system response is retry and the MESI state for the cache line in one of the L1 data cache and the L2 cache 140, prior to being updated, was modified, then the system bus controller 100 converts the response to the read command to a memory write for writing the cache line in the main memory 40. It should be noted that because the system bus receives the snoop response of the L1 data cache 120 and the L2 cache 140 to the read command, the system bus controller 100 is notified if the cache line includes modified data.

If the cache line does not include modified data and the system response to the read command is retry, then the system bus controller 100 discards the cache line.

By transferring the cache line to the transition cache 110, the MESI state of the cache line in the L1 data cache 120 and/or the L2 cache 140 can be immediately updated. Also, by waiting for the system response to the read command, the cache line may be written to the main memory 40 to improve the efficiency with which the main memory 40 is updated with modified data.

It should be understood that the present invention is not limited to a processor with only two levels of cache. Instead, additional levels of non-inclusive cache could be included, with the method for preventing collisions according to the present invention being applied to the second and higher levels of cache.

While the invention has been described with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A multi-processor, comprising:
   at least first and second processors;
   a system bus providing communication between said first and second processors;
   a bus arbiter generating system responses to commands on said system bus; said first processor generating a first command associated with a real address and snooping a second command on said system bus, said first processor including at least one cache, said cache generating a conditional retry response when said second command is associated with said real address, and said first processor generating a snoop response to said second command based on a system response to said first command when said cache generates a conditional retry response to said second command, wherein said first processor generates a retry response to said second command when said cache generates a conditional retry response to said second command and said system response to said first command is not a retry response.

2. The system of claim 1, wherein, prior to said snooping said second command, said first processor detects said first command on said system bus, and said cache changes a memory coherency image state of said first command to a pending state.

3. A multi-processor, comprising:
   at least first and second processors;
   a system bus providing communication between said first and second processors;
   a bus arbiter generating system responses to commands on said system bus;
   said first processor generating a first command associated with a real address and snooping a second command on said system bus, said first processor including at least one cache, said cache generating a conditional retry response when said second command is associated with said real address, and said first processor generating a snoop response to said second command based on a system response to said first command when said cache generates a conditional retry response to said second command, wherein said first processor does not generate a retry response to said second command when said cache generates a conditional retry response to said second command and said system response to said first command is a retry response.

4. The system of claim 3, wherein, prior to said snooping said second command, said first processor detects said first command on said system bus, and said cache changes a memory coherency image state of said first command to a pending state.

5. A multi-processor, comprising:

at least first and second processors;

a system bus providing communication between said first and second processors;

a bus arbiter generating system responses to commands on said system bus;

said first processor generating a first command associated with a real address and snooping a second command on said system bus, said first processor including at least one cache, said cache generating a conditional retry response when said second command is associated with said real address, and said first processor generating a snoop response to said second command based on a system response to said first command when said cache generates a conditional retry response to said second command, wherein said cache generates said conditional retry response when said second command is associated with said real address, said second command is a non-exclusive command, and memory coherency states for said real address in other caches of said first processor are known by said cache to be invalid.

6. A method for increasing communication efficiency in a multi-processor system, comprising:

generating a first command associated with a real address at a first processor;

snooping, at a cache in said first processor, a second command on a system bus, said second command generated by a second processor and associated with said real address, and said system bus providing communication between at least said first and second processors;

generating, at said cache, a conditional retry response when said snooping step snoops said second command associated with said real address; and generating a snoop response at said first processor to said second command based on a system response to said first command when said generating a conditional retry response step generates said conditional retry response to said second command, wherein said generating said snoop response step generates a retry response to said second command when said conditional retry response step generates said conditional retry response to said second command and said system response to said first command is not a retry response.

7. The method of claim 6, wherein, prior to said snooping a second command step, the method comprises:

detecting, at said first processor, said first command on said system bus; and changing a memory coherency image state of said first command at said first processor to a pending state.

8. A method for increasing communication efficiency in a multi-processor system, comprising:

generating a first command associated with a real address at a first processor;

snooping, at a cache in said first processor, a second command on a system bus, said second command generated by a second processor and associated with said real address, and said system bus providing communication between at least said first and second processors;

generating, at said cache, a conditional retry response when said snooping step snoops said second command associated with said real address; and generating a snoop response at said first processor to said second command based on a system response to said first command when said generating a conditional retry response step generates said conditional retry response to said second command, wherein said generating said snoop response step does not generate a retry response to said second command when said conditional retry response step generates said conditional retry response to said second command and said system response to said first command is a retry response.

9. The method of claim 8, wherein, prior to said snooping a second command step, the method comprises:

detecting, at said first processor, said first command on said system bus; and changing a memory coherency image state of said first command at said first processor to a pending state.

10. A method for increasing communication efficiency in a multi-processor system, comprising:

generating a first command associated with a real address at a first processor;

snooping, at a cache in said first processor, a second command on a system bus, said second command generated by a second processor and associated with said real address, and said system bus providing communication between at least said first and second processors;

generating, at said cache, a conditional retry response when said snooping step snoops said second command associated with said real address; and generating a snoop response at said first processor to said second command based on a system response to said first command when said generating a conditional retry response step generates said conditional retry response to said second command, wherein said generating a conditional retry response step generates said conditional retry response when said second command is associated with said real address, said second command is a non-exclusive command, and memory coherency states for said real address in other caches of said first processor are known by said cache to be invalid.

* * * * *